US009268954B2

(12) United States Patent
Brown et al.

(10) Patent No.: US 9,268,954 B2
(45) Date of Patent: Feb. 23, 2016

(54) SYSTEM AND METHOD FOR ROLE DISCOVERY

(75) Inventors: Timothy G. Brown, Fort Edward, NY (US); Bilhar S. Mann, Southampton, NY (US)

(73) Assignee: CA, Inc., New York, NY (US)

( * ) Notice: Subject to any disclaimer, the term of this patent is extended or adjusted under 35 U.S.C. 154(b) by 1642 days.

(21) Appl. No.: 12/575,039

(22) Filed: Oct. 7, 2009

(65) Prior Publication Data

US 2011/0083159 A1    Apr. 7, 2011

(51) Int. Cl.
*G06F 17/00* (2006.01)
*G06F 21/60* (2013.01)

(52) U.S. Cl.
CPC .................................. *G06F 21/604* (2013.01)

(58) Field of Classification Search
CPC ..................................................... G06F 21/604
USPC ........................................................... 726/1
See application file for complete search history.

(56) References Cited

U.S. PATENT DOCUMENTS

| 6,781,607 | B1 * | 8/2004 | Benham | 715/744 |
| 7,333,956 | B2 | 2/2008 | Malcolm | |
| 7,523,309 | B1 | 4/2009 | Talbot et al. | |
| 7,827,615 | B1 * | 11/2010 | Allababidi et al. | 726/28 |
| 7,865,603 | B2 * | 1/2011 | Braddy et al. | 709/229 |
| 2003/0037263 | A1 * | 2/2003 | Kamat et al. | 713/202 |
| 2007/0061324 | A1 * | 3/2007 | Morris | 707/9 |
| 2007/0220004 | A1 * | 9/2007 | Fifield et al. | 707/9 |
| 2008/0028453 | A1 * | 1/2008 | Nguyen et al. | 726/9 |
| 2010/0325686 | A1 * | 12/2010 | Davis et al. | 726/1 |

OTHER PUBLICATIONS

"EureKify Sage DNA Manual", User Manual Version 3.2, 243 pages, dated Sep. 2007.
"Orchestria Administrator Guide" Orchestria Active Policy Management Version 6.0, 370 pages, 2008.

* cited by examiner

*Primary Examiner* — Mohammad W Reza
(74) *Attorney, Agent, or Firm* — Baker Botts L.L.P.

(57) ABSTRACT

According to one embodiment, a method for role determination includes detecting access to sensitive data and determining user information related to the access to sensitive data in response to detecting the access to sensitive data. The method also includes modifying at least one role in response to determining the user information related to the access to sensitive data. In addition, the method includes storing the modified at least one role.

21 Claims, 3 Drawing Sheets

SYSTEM AND METHOD FOR ROLE DISCOVERY

TECHNICAL FIELD

This invention relates generally to user management and more particularly to a system and method for role discovery.

BACKGROUND

As computing systems become more complex, managing roles in the computing system has become more important. Role-based management provides flexible and secure solutions to access to resources. Developing roles has become problematic due to the proliferation of users of computing systems. Determining what users are associated with particular role(s) is an important problem to solve in order to develop effective role-based management.

A previous solution to this problem includes performing static scans of a computing system in order to determine how usage of the system is organized. This approach is inflexible and insecure because there may be a significant portion of time between the static scans that could lead to security vulnerabilities. For example, a team working on a project may have members added to in-between the static scans; as a result, the new member may not be added to a role until the next scan.

SUMMARY

According to one embodiment, a method for role determination includes detecting access to sensitive data and determining user information related to the access to sensitive data in response to detecting the access to sensitive data. The method also includes modifying at least one role in response to determining the user information related to the access to sensitive data. In addition, the method includes storing the modified at least one role.

In some embodiments, the method may include determining context information related to the access to sensitive data in response to detecting the access to sensitive data. The method may also include modifying at least one role in response to determining the context information related to the access to sensitive data. Modifying the at least one role may include adding a user associated with the user information to the at least one role. The access to sensitive data may include a message comprising sensitive data. Modifying the at least one role may include modifying the at least one role in response to determining that the access to sensitive data was valid.

According to one embodiment, a system for role determination includes an agent and a role manager. The agent is operable to detect access to sensitive data and determine user information related to the access to sensitive data in response to detecting the access to sensitive data. The role manager is operable to modify at least one role in response to the agent determining the user information related to the access to sensitive data. The role manager is also operable to store the modified at least one role.

Depending on the specific features implemented, particular embodiments may exhibit some, none, or all of the following technical advantages. Roles may be updated based on messages (e.g., e-mails). Roles may be updated on an event-driven basis. Other technical advantages will be readily apparent to one skilled in the art from the following figures, description and claims.

DETAILED DESCRIPTION

Figure 1:
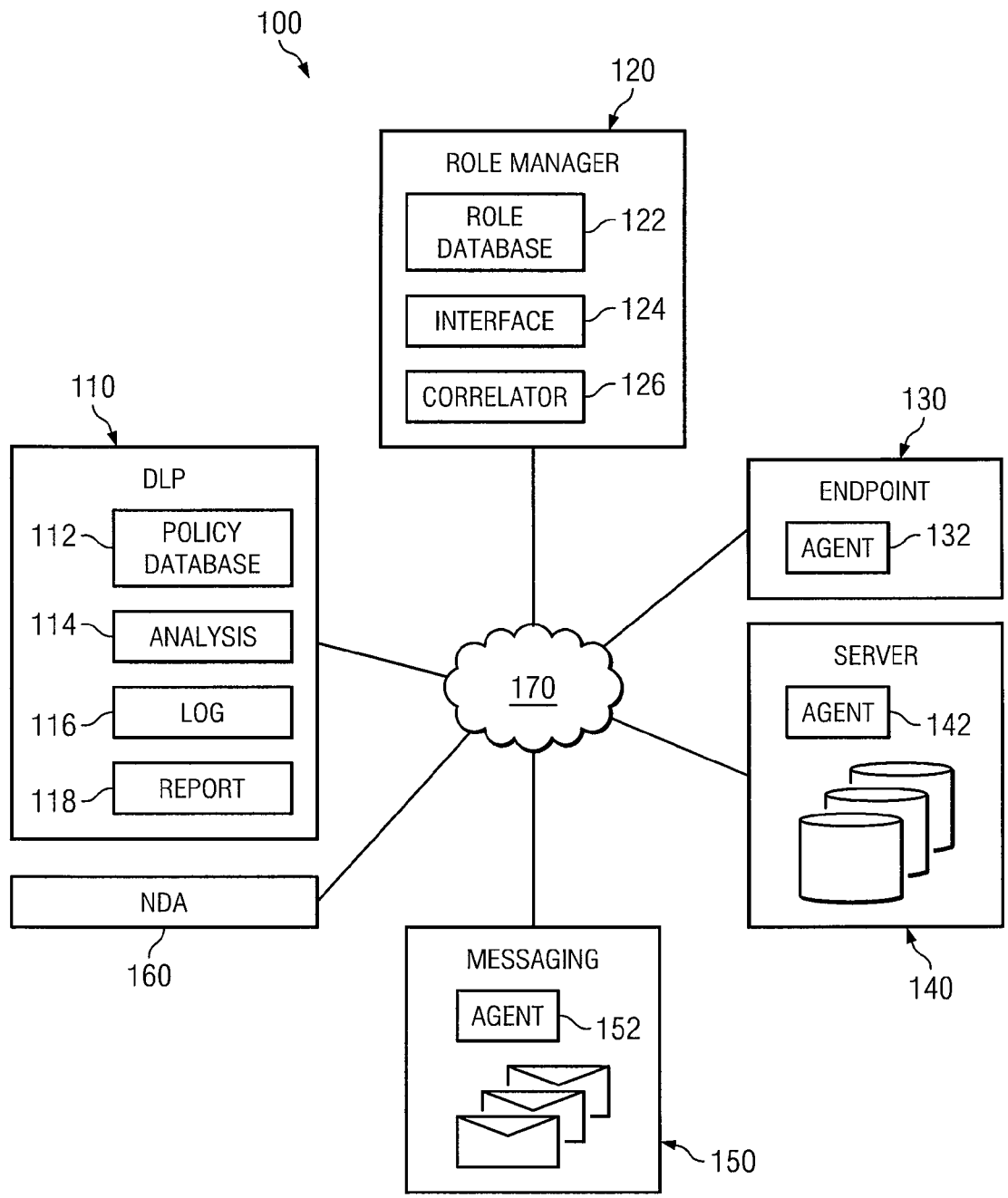
FIG. 1 illustrates one embodiment of a system for performing role discovery.

FIG. 1 illustrates one embodiment of system 100 for performing role discovery. System 100 includes Data Leakage Prevention (DLP) subsystem 110, role manager subsystem 120, endpoint 130, server 140, messaging subsystem 150, and Network Detection Agent (NDA) 160 all coupled to each other by network 170. DLP subsystem 110 includes policy database 112, analysis module 114, log module 116 and report module 118. Role manager subsystem 120 includes unique user database 122, interface 124, and correlator 126. Endpoint 130 includes agent 132. Server 140 includes agent 142. Messaging subsystem 150 includes agent 152.

Components 112, 114, 116, and 118 of DLP subsystem 110 may be implemented using software, hardware or a combination of the two. Components 112, 114, 116, 118 may, in some embodiments, be implemented on the same hardware as each other or different hardware. These components may also be implemented in virtualized environments. In addition, these components may be implemented using computing hardware coupled together in configurations such as clusters, Blade architectures, or suitable forms of distributed computing. Further details regarding the implementation of the components of DLP subsystem 110 are discussed below with respect to FIG. 2.

DLP subsystem 110, in some embodiments, may include various items in order to detect and/or prevent leakage of sensitive data. Policy database 112 may contain one or more policies that determine how sensitive data should be handled within system 100. Policies within policy database 112 may also include, in various embodiments, responses for situations where a leakage of sensitive data has been detected. Analysis module 114 may be configured to apply the policies to detect the activity within system 100. For example, analysis module 114 may receive information from agents 132, 142, 152 and/or 160 and apply one or more policies from policy database 112 by comparing the detected activity to the one or more policies. Log module 116 may maintain a history of activity reported by agents 132, 142, 152 and/or 160. Log module 116 may also record analysis performed by analysis module 114. For example, if analysis module 114 detects a violation of a policy stored in policy database 112, log module 116 may record the violation and information about the violation. Report module 118 may be configured to report events related to the activities of DLP subsystem 110. For example, if DLP subsystem 110 detects a violation of a policy within policy database 112, report module 118 may be configured to send a warning to an administrator. In addition, report module 118 may send information related to activities regarding sensitive data to role manager subsystem 120. For example, agents such as agents 132, 142, 152 and 160 may send information regarding activities regarding sensitive data to DLP subsystem 110 for analysis. Report module 118 may send such information to role manager subsystem 120.

Components 122, 124, and 126 of role manager subsystem 120 may be implemented in software, hardware or a combination of the two. These components may also be implemented in virtualized environments. In addition, these components may be implemented using computing hardware coupled together in configurations such as clusters, Blade architectures, or suitable forms of distributed computing. Further details regarding the implementation of the components of role manager subsystem 120 are discussed below with respect to FIG. 2.

Role manager subsystem 120 may be utilized to manage roles associated with users of system 100. Role database 122 includes roles that determine what type of information and access is allowed for users of system 100. Such roles may include grouping users into functional working groups and determining permissions for users. Roles may also be defined for systems or applications and similar permissions may be assigned to systems or applications as they are to users. Roles may encompass a wide variety of attributes regarding users and/or applications. For example, roles may be determined based on permissions, actual location, logical or virtual location, network location, job description, job title, job function, and/or other suitable attributes. In various embodiments, attributes may be combined in a variety of suitable combinations to form roles.

Interface 124 may be used to communicate with various aspects of system 100. For example, interface 124 may communicate with DLP subsystem 110 and receive information regarding activity within system 100. Interface 124, in some embodiments, may also be used to perform scans upon data within system 100 to facilitate role manager subsystem 120 determining roles.

Correlator 126 may be used by role manager of system 120 to add, modify or remove roles from role database 122. In some situations, correlator 126 may use information received at interface 124 to add, modify or remove roles from role database 122. In various embodiments, correlator 126 may be configured to interact with roles on a static or a dynamic basis. For example, correlator 126 may operate on a static basis by participating in scheduled scans of various aspects of system 100 to determine proper roles. As another example, interface 126 may be configured to dynamically analyze data received at role manager subsystem 120 to determine whether and how roles should be modified.

Agents 132, 142 and 152 may be implemented in software, hardware or a combination of the two. In some embodiments, agents 132, 142 and 152 may be software agents installed on endpoint 130, server 140 and messaging subsystem 150, respectively. They may also be implemented in virtualized environments. Further details regarding their implementation are discussed below with respect to FIG. 2.

Agents 132, 142 and 152 may, in some embodiments, analyze the handling of sensitive information by endpoint 130, server 140 and messaging system 150 respectively. Agents 132, 142, and 152 may be configured to report access to sensitive data to DLP subsystem 110. These agents, in some embodiments, may also be configured to apply policies to detected activity regarding sensitive data and take responses based on the application of the policies to the activity regarding sensitive data. Such responses may include reporting to DLP subsystem 110, reporting to administrators, and/or taking actions to prevent the leakage of sensitive data.

Endpoint 130, server 140 and messaging system 150 may be implemented in a suitable combination of software, hardware or both. Endpoint 130, server 140 and messaging system 150 may be implemented using software, hardware or a combination of the two. Endpoint 130, server 140 and messaging system 150 may, in some embodiments, be implemented on the same hardware as each other or different hardware. They may also be implemented in virtualized environments. In addition, in particular embodiments, they may be implemented using computing hardware coupled together in configurations such as clusters, Blade architectures, or suitable forms of distributed computing. Further details regarding the implementation of endpoint 130, server 140 and messaging system 150 are discussed below with respect to FIG. 2.

Endpoint 130, server 140, and messaging system 150 provide examples of the variety of contexts that system 100 supports for determining roles and monitoring access to sensitive data. Endpoint 130 may represent a variety of devices that may be used within system 100. For example, endpoint 130 may be a computer or a mobile device. Endpoint 130 may be used by users of system 100 as well as administrators and technicians. Mobile devices may include laptops, netbooks, mobile telephones, personal digitals assistants, and other suitable devices. Server 140 may provide a variety of services to system 100. Server 140 may provide services such as database services, storage services, gateway services, networking services, file services and other suitable services. Messaging system 150 may provide a variety of messaging services to system 100. For example, messaging system 150 may provide email services, chat services, instant messaging services and other suitable messaging services. Messaging system 150 may store data regarding users applications and/or messages as part of providing such services.

NDA 160 may be implemented as a stand-alone unit within network 170 or may be a software or hardware module coupled to another entity on network 170. Such other entities may include endpoint 130, server 140 or messaging system 150. Network detection agent (NDA) 160 may examine transmissions occurring within network 170 and notify DLP subsystem 110 of activities related to sensitive data. In some embodiments, NDA 160 may include policies that are applied to activity involving sensitive data NDA 160 detects on network 170. NDA 160 may be configured to report activity to DLP subsystem 110 in accordance with those policies. For example, if NDA 160 detects the use of sensitive data on network 170, NDA 160 may gather context information regarding the activity and send it to DLP subsystem 110.

Network 170, in some embodiments, is a communicative platform operable to exchange data or information. Network 170 could be a plain old telephone system (POTS). In various embodiments, network 170 could be any packet data network offering a communications interface or exchange between any two nodes in system 100. Network 170 may alternatively be any local area network (LAN), metropolitan area network (MAN), wide area network (WAN), wireless local area network (WLAN), virtual private network (VPN), intranet, Internet, or any other appropriate architecture or system that facilitates communications in a network or telephonic environment, including a combination of any networks or systems described above. Network 130 may also include wireless technology such as WiMAX, LTE, or any of a variety of cellular data networks.

In operation, system 100 may update roles in response to detecting activity regarding sensitive data. In some embodiments, agents such as agents 132, 142, 152 and/or 160 may detect activity related to sensitive data and report it to DLP subsystem 110. Report module 118 may then send those reports to interface 124 of role manager subsystem 120. As a result, correlator 126 may examine the reported activity and modify one or more roles in role database 122. In various embodiments, agents 132, 142, 152 and/or 160 may be configured to report activity regarding sensitive data to interface 124 as well as to DLP subsystem 110. In response to receiving such transmissions from agents 132, 142, 150 and/or 160, correlator 126 may use the information to update one or more roles in role database 122.

In one example, a user of endpoint 130 may access a file with sensitive data and relate it to a project named "Project A". This may be done because the user has just been added to the team of users working on Project A. In response, agent 132 may detect the access to the sensitive data and report the activity to DLP subsystem 110. Analysis module 114 may examine the policies associated with that user as well as with the sensitive data from policy database 112 and make a determination whether or not such access is allowable. In addition, core module 118 may send a report of the activity to role manager subsystem 120, in particular interface 124. This report may include the file that has been accessed, the user who accessed the file, the time in which it was accessed, the system from which it was accessed, as well as a user name or identifier associated with the user. In response, correlator 126 may examine the roles associated with the user as well as the file. In various embodiments, correlator 126 may determine to add the user to a role associated with Project A. Thus, a role may be dynamically modified in various embodiments.

As another example, server 140 may provide file services to users of network 170 such as operating as an FTP server. A user of system 100 may upload a file contained sensitive data to a directory on server 140. Agent 142 may detect the file containing sensitive data and may determine that two other users, User A and User B, also have access to the directory where the file with sensitive data was uploaded. Agent 142 may report this activity to DLP subsystem 110. Report module 118 may send this activity to interface 124. In various embodiments, agent 142 may send this information directly to interface 124. The information received at interface 124 may include the identity of the sensitive data as well as context information regarding the access of the sensitive data. The context information in this example may include items such as the identity of the user who uploaded the file, the identity of the FTP server, the folder name where the file was uploaded and the identities of the users who also have access to the folder where the file was uploaded. In response correlator 126 may interact with role database 122 to determine if any roles need to be modified based on the access to sensitive data. For example, interface 124 may determine a role for users with access to the sensitive data that was uploaded to server 140. In this example, correlator 126 may determine that users A and B were not part of the role that indicated access to the sensitive data. In response, correlator 126 may modify that role by adding User A and User B to the role. In such a manner, the role regarding access to that file with sensitive data may be modified dynamically.

In yet another example, messaging system 150 may offer email services to users of system 100. Messaging 150 may receive an email from user A to users B and C. The email may contain sensitive data either in the text of the email or in an attachment. Agent 152 may detect the sensitive data and report the activity regarding the sensitive data to DLP subsystem 110. Report module 118 may send the identity of the sensitive data and the context information regarding the activity involving the sensitive data to role manager subsystem 120 through interface 124. Correlator 126 may examine this context information and the sensitive data and modify a role within role database 122 in response to the analysis. For example, the context information may include the identity of the sender of the email as well as the recipients of the email. Correlator 126 may examine a role associated with the sensitive data and may determine that only users A and B are within the role. As a result, correlator 126 may add user C to the role in response to receiving the information about the sensitive information being in an email sent to user C. As a result, in some embodiments, system 100 provides the ability to update roles dynamically based on messages such as emails being sent involving sensitive data.

Figure 2:
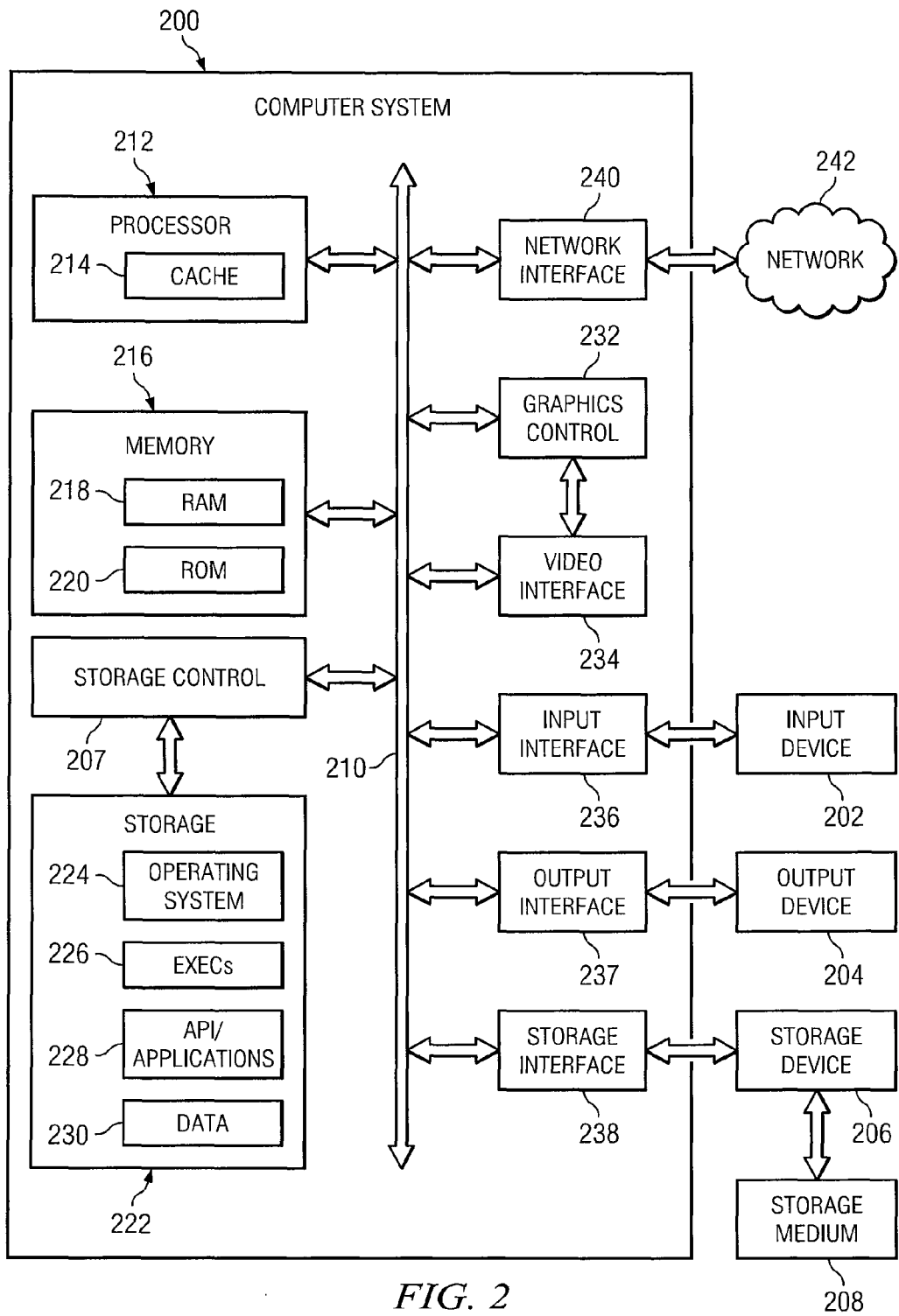
FIG. 2 illustrates an example computer system suitable for implementing one or more portions of particular embodiments.

FIG. 2 illustrates an example computer system 200 suitable for implementing one or more portions of particular embodiments. Although the present disclosure describes and illustrates a particular computer system 200 having particular components in a particular configuration, the present disclosure contemplates any suitable computer system having any suitable components in any suitable configuration. Moreover, computer system 200 may have take any suitable physical form, such as for example one or more integrated circuit (ICs), one or more printed circuit boards (PCBs), one or more handheld or other devices (such as mobile telephones or PDAs), one or more personal computers, or one or more super computers. Components discussed above with respect to FIG. 1 may be implemented using all of the components, or any appropriate combination of the components, of computer system 200 described below.

Computer system 200 may have one or more input devices 202 (which may include a keypad, keyboard, mouse, stylus, etc.), one or more output devices 204 (which may include one or more displays, one or more speakers, one or more printers, etc.), one or more storage devices 206, and one or more storage medium 208. An input device 202 may be external or internal to computer system 200. An output device 204 may be external or internal to computer system 200. A storage device 206 may be external or internal to computer system 200. A storage medium 208 may be external or internal to computer system 200.

System bus 210 couples subsystems of computer system 200 to each other. Herein, reference to a bus encompasses one or more digital signal lines serving a common function. The present disclosure contemplates any suitable system bus 210 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 200 includes one or more processors 212 (or central processing units (CPUs)). A processor 212 may contain a cache 214 for temporary local storage of instructions, data, or computer addresses. Processors 212 are coupled to one or more storage devices, including memory 216. Memory 216 may include random access memory (RAM) 218 and read-only memory (ROM) 220. Data and instructions may transfer bidirectionally between processors 212 and RAM 218. Data and instructions may transfer unidirectionally to processors 212 from ROM 220. RAM 218 and ROM 220 may include any suitable computer-readable storage media.

Computer system 200 includes fixed storage 222 coupled bi-directionally to processors 212. Fixed storage 222 may be coupled to processors 212 via storage control unit 207. Fixed storage 222 may provide additional data storage capacity and may include any suitable computer-readable storage media. Fixed storage 222 may store an operating system (OS) 224, one or more executables (EXECs) 226, one or more applications or programs 228, data 230 and the like. Fixed storage 222 is typically a secondary storage medium (such as a hard disk) that is slower than primary storage. In appropriate cases, the information stored by fixed storage 222 may be incorporated as virtual memory into memory 216.

Processors 212 may be coupled to a variety of interfaces, such as, for example, graphics control 232, video interface 234, input interface 236, output interface 237, and storage interface 238, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 240 may couple processors 212 to another computer system or to network 242. Network interface 240 may include wired, wireless, or any combination of wired and wireless components. Such components may include wired network cards, wireless network cards, radios, antennas, cables, or any other appropriate components. With network interface 240, processors 212 may receive or send information from or to network 242 in the course of performing steps of particular embodiments. Particular embodiments may execute solely on processors 212. Particular embodiments may execute on processors 212 and on one or more remote processors operating together.

In a network environment, where computer system 200 is connected to network 242, computer system 200 may communicate with other devices connected to network 242. Computer system 200 may communicate with network 242 via network interface 240. For example, computer system 200 may receive information (such as a request or a response from another device) from network 242 in the form of one or more incoming packets at network interface 240 and memory 216 may store the incoming packets for subsequent processing. Computer system 200 may send information (such as a request or a response to another device) to network 242 in the form of one or more outgoing packets from network interface 240, which memory 216 may store prior to being sent. Processors 212 may access an incoming or outgoing packet in memory 216 to process it, according to particular needs.

Particular embodiments involve one or more computer-storage products that include one or more tangible, computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, optical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 216 may include one or more computer-readable storage media embodying software and computer system 200 may provide particular functionality described or illustrated herein as a result of processors 212 executing the software. Memory 216 may store and processors 212 may execute the software. Memory 216 may read the software from the computer-readable storage media in mass storage device 216 embodying the software or from one or more other sources via network interface 240. When executing the software, processors 212 may perform one or more steps of one or more processes described or illustrated herein, which may include defining one or more data structures for storage in memory 216 and modifying one or more of the data structures as directed by one or more portions the software, according to particular needs. In addition or as an alternative, computer system 200 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

In some embodiments, the described processing and memory elements (such as processors 212 and memory 216) may be distributed across multiple devices such that the operations performed utilizing these elements may also be distributed across multiple devices. For example, software operated utilizing these elements may be run across multiple computers that contain these processing and memory elements. Other variations aside from the stated example are contemplated involving the use of distributed computing.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Figure 3:
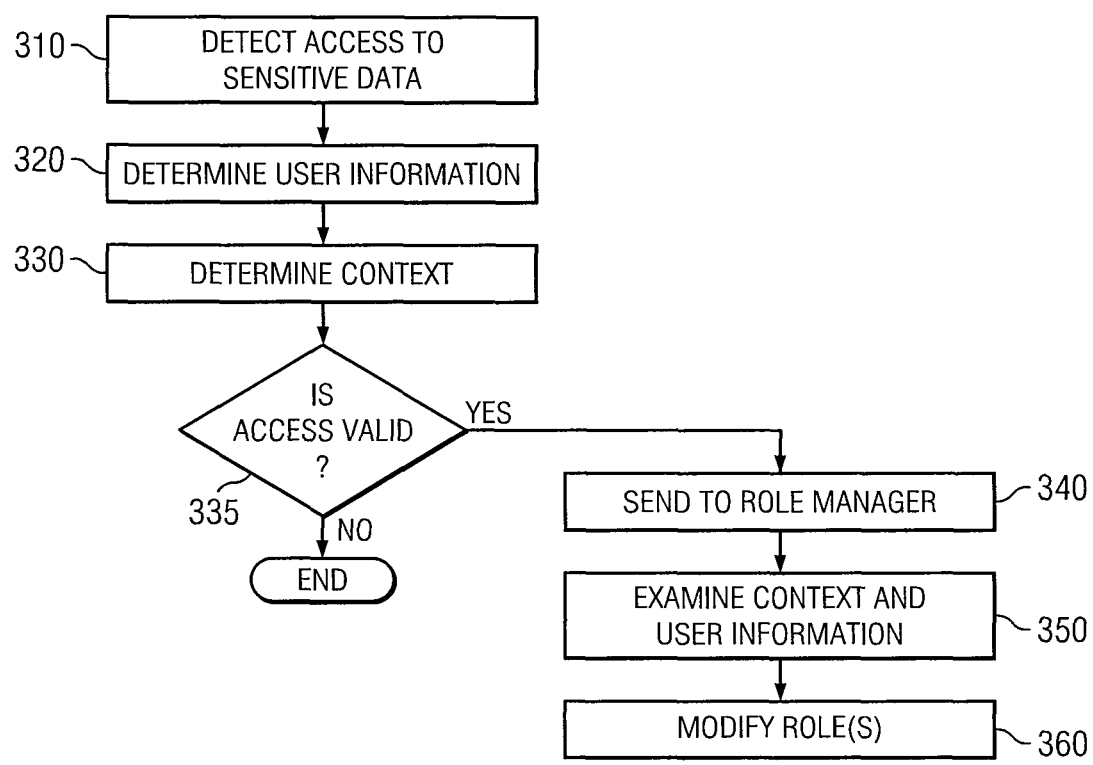
FIG. 3 is a flowchart illustrating one embodiment of updating roles based on activity regarding sensitive data.

FIG. 3 is a flowchart illustrating one embodiment of updating roles based on activity regarding sensitive data. In general, the steps illustrated in FIG. 3 may be combined, modified, or deleted where appropriate, and additional steps may also be added to the example operation. Furthermore, the described steps may be performed in any suitable order.

At step 310, in some embodiment, access to sensitive data may be detected. This may be accomplished using agents of a DLP system. The agents may reside on a variety of nodes on a network or maybe a node in and of itself on a network. For example, suitable embodiments of agents include agents 132, 142, 152 and 160 of FIG. 1. At step 320, user information regarding the access to sensitive data may be determined. Such information may include a user identifier, a user name or other forms of identification. User information may also include any groups or roles that the user is a part of, in various embodiments. User information may be determined using the agents or by using a DLP subsystem such as, for example, DLP subsystem 110.

At step 330, in some embodiments, context information regarding the access to sensitive data may be determined. In various embodiments, step 330 may be performed before or during step 320. The context information may be determined by agents or by a DLP subsystem. Context information may include a variety of information depending upon the type of access to sensitive data. For example, if the access to sensitive data was detected in an email context, information may include the sender of the email, the recipients of the email, servers that handled the email, the time that the email was sent, the location information associated with either the sender of the email and/or the recipients of the email, etc.

At step 335, in some embodiments, the access to the sensitive data is analyzed to determine if the access was valid. This may be done using a DLP system such as DLP subsystem 110. For example, if an email is sent with sensitive data and the DLP system determines that sending the email was contrary to certain policies, then it may be determined that the access to the sensitive data was not a valid access. As another example, a financial application may be accessed by a particular user and one or more policies may indicate that the particular user should not have accessed the financial application. If the access detected at step 310 is determined to be valid, then the method may proceed to step 340. If the access is determined not to be valid, then the procedure may be completed and the information may not be sent to a role manager. This may prevent access to sensitive data that is invalid or contrary to established policies from affecting the configuration of roles. For example, if a user should not have access to sensitive data but did access it, it may be desirable not to send the access information to a role manager in order to prevent erroneously adding that user to a role associated with the sensitive data. In some embodiments, if an access is not valid, information may still be sent to role manager 340 as discussed further below.

At step 340, in some embodiments, information regarding the access to sensitive data may be sent to a role manager. The information may include the user or application that accesses sensitive data as well as context information regarding the access to sensitive data detected in step 310. The information may also include whether the access violated any policies as determined at step 335. At step 350, the context and user information that was sent to the role manager in step 340 may be analyzed. This may be done to determine what role was implicated by the access to the sensitive data. For example, roles regarding the user as well as roles regarding the context information may be implicated and analyzed at this step.

At step 360, one or more roles may be modified in response to the access to sensitive data. In various embodiments, the one or more roles may be modified. Determinations by a DLP system as to whether or not the access to the sensitive data was valid may also be used to modify one or more roles.

For example, if the access to sensitive data that triggered the modification of the roles at step 360 was an email sent from user A to users B and C, roles may be modified in one or more ways. For example, at step 350, a role called "role 1" may have been selected based on the sensitive data. In role 1, user A may be the only user involved in the email that was associated with the role. It may also have been determined at step 335 that access to the sensitive data by user B was valid but access to the sensitive data by user C was not valid. In such a scenario, at step 360, role 1 may be modified by adding user B but not user C to role 1. If role one contained users A, B and C, role 1 may be modified by removing user C. In a situation where users A, B and C all have valid access to the sensitive data and yet no role was found regarding the sensitive data, a new role may be created and users A, B and C may be added to that role.

While modifying roles based on users has been described in various embodiments, applications may also have roles associated with them and they may be modified based on activity regarding sensitive data. For example, if a backup server automatically receives sensitive data due to a backup process, an agent on the backup server may report the presence of the sensitive data to a DLP system. The information regarding this access to sensitive data may be sent to the role manager (at step 340) and, at step 360, roles involving the backup server may be accessed and analyzed in accordance with the examination occurring in step 350. The identity of the backup server location or address of the backup server may also be used to modify the role such as by adding the backup server to the role involving the access to sensitive data.

At step 360 roles may also be modified not merely by adding entities such as users or applications but also modifying the way entities are treated based on access to sensitive data in various embodiments. For example, if activity is determine to involve sensitive data and a particular user, a role associated with the user may be modified such that the user may be examined more closely. Periodic scans of the users activity or systems associated with the user may occur more frequently as a result of the modification of the role. As another example, if it is determined that a server now has access to sensitive data, a role associated with the server might be modified so that the server may be scanned more often. As a result, in various embodiments, roles may be updated or modified dynamically based on activity regarding sensitive data.

Although several embodiments have been illustrated and described in detail, it will be recognized that modifications and substitutions are possible without departing from the spirit and scope of the appended claims.

What is claimed is:

1. A method for role determination, comprising:
   receiving an indication from a first computer system that a user accessed monitored data;
   automatically determining, by a processor, user information related to the user that accessed the monitored data in response to receiving the indication from the first computer system;
   automatically determining, by the processor, a role associated with the monitored data;
   automatically modifying the role, by the processor, in response to determining the user information; and
   storing, by the processor, the modified role.

2. The method of claim 1, further comprising:
   determining context information related to the user's access of the monitored data in response to receiving the indication from the first computer system; and
   wherein modifying the role comprises modifying the role in response to determining the context information related to the access to sensitive data.

3. The method of claim 1, wherein modifying the role comprises adding the user associated with the user information to the role.

4. The method of claim 1, wherein the indication comprises information that the user accessed a message comprising the monitored data.

5. The method of claim 1, wherein modifying the role comprises modifying the role in response to determining that the user's access of the monitored data was valid.

6. The method of claim 1, wherein modifying the role comprises increasing the level of scrutiny applied to the user associated with the user information.

7. The method of claim 1, wherein the indication comprises information that a file comprising monitored data was saved to a directory.

8. A computer program product comprising:
   a computer readable non-transitory storage medium having computer readable program code embodied therewith, the computer readable program code comprising:

computer readable program code configured to receive an indication that a user accessed monitored data from a first computer system;

computer readable program code configured to automatically determine user information related to the user that accessed the monitored data in response to receiving the indication from the first computer system;

computer readable program code configured to automatically determine a role associated with the monitored data;

computer readable program code configured to automatically modify the role in response to determining the user information; and computer readable program code configured to store the modified role.

9. The computer program product of claim 8, wherein the the computer readable program code further comprises:

computer readable program code configured to determine context information related to the user's access of the monitored data in response to receiving the indication from the first computer system; and wherein the computer readable program code configured to modify the role comprises computer readable program code configured to modify the role in response to determining the context information related to the access to sensitive data.

10. The computer program product of claim 8, wherein modifying the role comprises adding a user associated with the user information to the role.

11. The computer program product of claim 8, wherein the indication comprises information that the user accessed a message comprising the monitored data.

12. The computer program product of claim 8, wherein modifying the role comprises modifying the role in response to determining that the user's access of the monitored data was valid.

13. The computer program product of claim 8, wherein modifying the role comprises increasing the level of scrutiny applied to the user associated with the user information.

14. The computer program product of claim 8, wherein the indication comprises information that a file comprising monitored data was saved to a directory.

15. A system for role determination, comprising:

an agent comprising a first hardware processor, the agent being operable to:
  detect access to monitored data;
  automatically determine, using the first hardware processor, user information related to the access to monitored data in response to detecting the access to monitored data; and a role manager comprising a second hardware processor and a memory, the role manager being operable to:
  automatically determine a role associated with the monitored data;
  automatically modify the role, using the second hardware processor, in response to the agent determining the user information related to the access to monitored data; and
  store the modified role using the memory.

16. The system of claim 15, wherein:

the agent is operable to determine context information regarding the access to monitored data; and the role manager is operable to modify the role, using the second hardware processor, in response to the agent determining the user information and the context information related to the access to monitored data.

17. The system of claim 15, wherein the role manager modifying the role comprises the role manager adding a user associated with the user information to the role.

18. The system of claim 15, wherein the access to monitored data comprises a message comprising sensitive data.

19. The system of claim 15, wherein the role manager modifying the role comprises the role manager modifying the role in response to a determination that the access to monitored data was valid.

20. The system of claim 15, wherein the role manager modifying the role comprises the role manager increasing the level of scrutiny applied to a user associated with the user information.

21. The system of claim 15, wherein the access to monitored data comprises saving a file comprising monitored data to a directory.

* * * * *